(12) United States Patent
Sato et al.

(10) Patent No.: US 8,549,955 B2
(45) Date of Patent: Oct. 8, 2013

(54) BICYCLE CONTROL DEVICE

(75) Inventors: Hisayuki Sato, Osaka (JP); Kenji Ose, Osaka (JP)

(73) Assignee: Shimano Inc., Osaka (JP)

( * ) Notice: Subject to any disclaimer, the term of this patent is extended or adjusted under 35 U.S.C. 154(b) by 1170 days.

(21) Appl. No.: 11/756,703

(22) Filed: Jun. 1, 2007

(65) Prior Publication Data

US 2008/0295635 A1    Dec. 4, 2008

(51) Int. Cl.
| B62M 25/00 | (2006.01) |
| F16C 1/12 | (2006.01) |
| G05G 11/00 | (2006.01) |
| B62K 23/06 | (2006.01) |
| B62L 3/02 | (2006.01) |
| B62M 25/04 | (2006.01) |

(52) U.S. Cl.
CPC . B62K 23/06 (2013.01); B62L 3/02 (2013.01); B62M 25/04 (2013.01)
USPC ................................ 74/502.2; 74/488; 74/489

(58) Field of Classification Search
USPC .............. 74/502.2, 488, 489, 473.13, 473.14; 474/80; 192/217
See application file for complete search history.

(56) References Cited

U.S. PATENT DOCUMENTS

| 4,532,825 | A | | 8/1985 | Nagano |
| 4,995,280 | A | | 2/1991 | Tagawa |
| 5,094,120 | A | | 3/1992 | Tagawa |
| 5,241,878 | A | * | 9/1993 | Nagano ........................ 74/502.2 |
| 5,257,683 | A | | 11/1993 | Romano |
| 5,400,675 | A | | 3/1995 | Nagano |
| 5,479,776 | A | | 1/1996 | Romano |
| 5,806,372 | A | * | 9/1998 | Campagnolo .............. 74/473.14 |
| 6,155,132 | A | | 12/2000 | Yamane |
| 6,698,567 | B2 | * | 3/2004 | Dal Pra' ........................ 192/217 |
| 6,810,764 | B2 | | 11/2004 | Chen |
| 7,194,928 | B2 | | 3/2007 | Kawakami |
| 7,665,384 | B2 | * | 2/2010 | Sato et al. .................... 74/502.2 |
| 2002/0020246 | A1 | | 2/2002 | Campagnolo |
| 2002/0124678 | A1 | * | 9/2002 | Chen ........................... 74/502.2 |
| 2004/0237697 | A1 | * | 12/2004 | Kawakami ................... 74/501.6 |
| 2007/0245847 | A1 | * | 10/2007 | Chen ........................... 74/502.2 |
| 2007/0261507 | A1 | * | 11/2007 | Funai .......................... 74/502.2 |
| 2008/0295638 | A1 | * | 12/2008 | Miki et al. ................... 74/502.2 |
| 2008/0314183 | A1 | * | 12/2008 | Miki .......................... 74/473.13 |
| 2008/0314184 | A1 | * | 12/2008 | Miki .......................... 74/473.14 |

(Continued)

FOREIGN PATENT DOCUMENTS

| DE | 44 13 610 A1 | 11/1994 |
| EP | 0 853 035 A2 * | 7/1998 |

(Continued)

*Primary Examiner* — Vinh Luong
(74) *Attorney, Agent, or Firm* — Global IP Counselors (57) ABSTRACT

A bicycle control device is basically provided with a base member, a shift control unit, a non-shift operating lever, a first shift operating lever and a second shift operating lever. The shift control unit is mounted to the base member. The non-shift operating lever is movably coupled relative to the base member. The first and second shift operating levers are operatively coupled to the shift control unit. The second shift operating lever is a separate member from the first shift operating lever. The first and second shift operating levers are configured and arranged relative to each other such that the second shift operating lever is moved by the first shift operating lever when the first shift operating lever is operated.

15 Claims, 10 Drawing Sheets

(56) References Cited

U.S. PATENT DOCUMENTS

| | | | | |
|---|---|---|---|---|
| 2008/0314185 A1* | 12/2008 | Miki | ............................ | 74/473.14 |
| 2008/0314191 A1* | 12/2008 | Miki et al. | ..................... | 74/502.2 |
| 2009/0054182 A1* | 2/2009 | Miki et al. | ........................ | 474/80 |
| 2009/0114051 A1* | 5/2009 | Miki | ................................ | 74/489 |
| 2011/0079103 A1* | 4/2011 | Kususe et al. | ................. | 74/502.2 |
| 2012/0297912 A1* | 11/2012 | Emura et al. | ................ | 74/473.14 |
| 2012/0297918 A1* | 11/2012 | Miki et al. | .................... | 74/502.2 |
| 2012/0318096 A1* | 12/2012 | Fukao et al. | .................. | 74/502.2 |
| 2013/0081506 A1* | 4/2013 | Fukao | ........................... | 74/502.2 |

FOREIGN PATENT DOCUMENTS

| | | |
|---|---|---|
| EP | 1 736 404 A1 | 12/2006 |
| EP | 1 739 001 A1 | 1/2007 |
| FR | 2 812 854 A1 | 2/2002 |
| JP | 3283289 B2 | 3/2002 |

* cited by examiner

FIG. 15 ic # BICYCLE CONTROL DEVICE

BACKGROUND OF THE INVENTION

1. Field of the Invention

This invention generally relates to a bicycle control device for operating a bicycle component. More specifically, the present invention relates to a bicycle control (component actuating) device that has three operating members that are conveniently located for a rider to operate.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle, especially the bicycle control devices for performing shifting and braking operations.

Typically, bicycle shifters mechanically operate derailleurs via cables, while bicycle brake levers mechanically operate brake devices via cables. In either case, an operating force is typically applied by one of the rider's fingers to operate a control lever, which in turn transmitted the operating force to the drive component of a bicycle shifting mechanism by a cable that was fixed at one end to the control lever. Currently, many different types of control devices exist for performing shifting and braking operations.

Sometimes the bicycle shifter and the bicycle brake lever are combined as a single integrated unit, while other times they are separate individual units. In the case of road bikes with drop type handlebars, the bicycle shifter and the bicycle brake lever are often combined as a single integrated control device. In some cases, a braking function and a shifting function is performed by a single dual function lever, One example of this type of control device is disclosed in U.S. Pat. No. 5,400,675 to Nagano (assigned to Shimano, Inc). More typically, one or two shift levers are provided in addition to the brake lever. One example of this type of control device is disclosed in U.S. Pat. No. 5,257,683 to Romano (assigned to Campagnolo). While these types of control devices work well, it is sometimes desirable to provide a bicycle control (component actuating) device with operating members that are conveniently located for a rider to operate and in which each of the operating members has a single control (component actuating) function. This allows the rider to easily operate the control device.

In view of the above, it will be apparent to those skilled in the art from this disclosure that there exists a need for an improved bicycle component actuating device. This invention addresses this need in the art as well as other needs, which will become apparent to those skilled in the art from this disclosure.

SUMMARY OF THE INVENTION

One object of the present invention is to provide a control (component actuating) that has a non-shift operating lever and a pair of shift operating members that are conveniently located for a rider to operate.

The foregoing objects can basically be attained by providing a bicycle control device that basically comprises a base member, a shift control unit, a non-shift operating lever, a first shift operating lever and a second shift operating lever. The shift control unit is mounted to the base member. The non-shift operating lever is movably coupled relative to the base member. The first shift operating lever is operatively coupled to the shift control unit. The second shift operating lever is operatively coupled to the shift control unit. The second shift operating lever is a separate member from the first shift operating lever The first and second shift operating levers are configured and arranged relative to each other such that the second shift operating lever is moved by the first shift operating lever when the first shift operating lever is operated.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings It will be apparent to those skilled in the art from this disclosure that the following descriptions of the embodiments of the present invention are provided for illustration only and not for the purpose of limiting the invention as defined by the appended claims and their equivalents.

Figure 1:
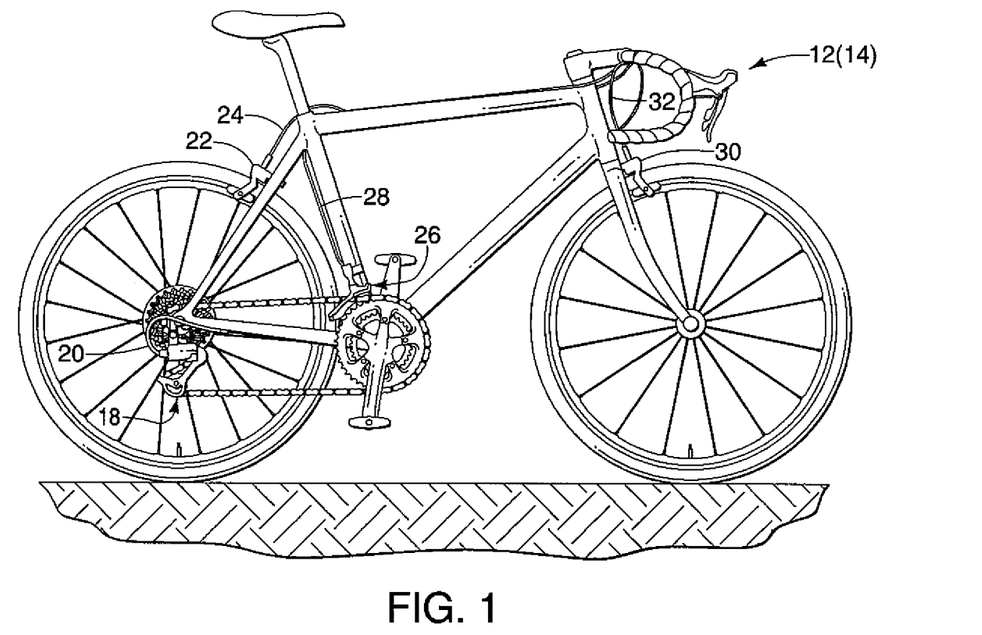
FIG. 1 is a side elevational view of bicycle equipped with a pair of bicycle component actuating (brake/shift) devices (only one shown) coupled to a drop type handlebar in accordance with a preferred embodiment of the present invention.
Figure 2:
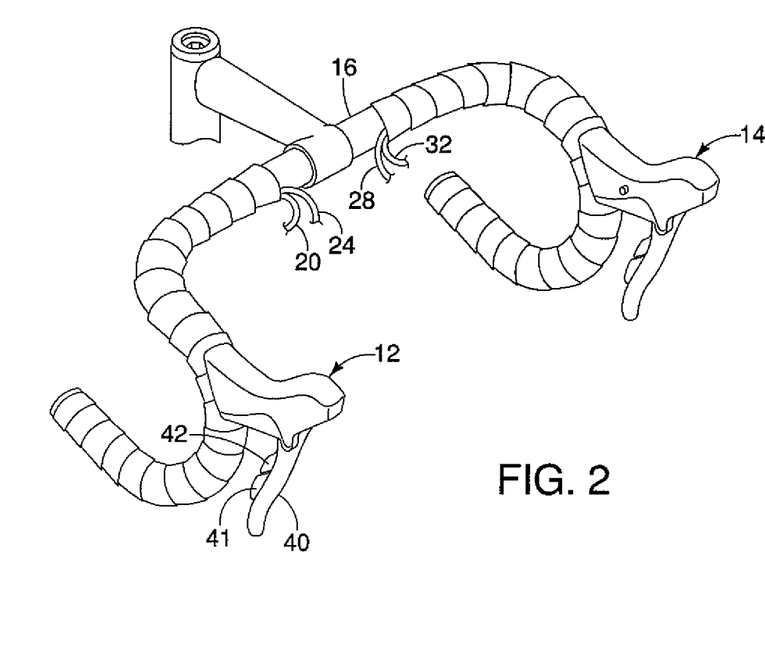
FIG. 2 is an enlarged partial perspective view of the drop type handlebar with the pair of bicycle component actuating (brake/shift) devices in accordance with the illustrated embodiment of the present invention.

Referring initially to FIGS. 1 and 2, a bicycle 10 is illustrated in accordance with a pair of bicycle control devices 12 and 14 mounted on a bicycle handlebar 16 in accordance with one embodiment of the present invention. The bicycle control device 12 is a night hand side control device operated by the rider's right hand, while the bicycle control device 14 is a left hand side control device operated by the rider's left hand. In the illustrated embodiment, the bicycle control device 12 is operatively coupled to a rear derailleur 18 via a shift control cable 20 and a rear brake device 22 via a brake control cable 24. The bicycle control device 14 is operatively coupled to a front derailleur 26 via a shift control cable 28 and a front brake device 30 via a brake control cable 32. Alternatively, the bicycle control devices 12 and 14 can be switched so that the rider can operate the rear derailleur 18 and the front derailleur 26 with opposite hands and/or operate the rear and front brake devices 22 and 30 with opposite hands. In the illustrated embodiment, the left hand side bicycle control device 14 is substantially identical to the right hand side bicycle control device 12, except for the shifting unit has been modified to reduce the number of gears that can be shifted. In any event, the left hand side bicycle control device 14 is essentially identical in construction and operation to the right hand side bicycle control device 12, except that the left hand side bicycle control device 14 is a mirror image of the right hand side bicycle control device 12 and the number of shift positions for the left hand side bicycle control devices 12 and 14 are different. Thus, only the right hand side bicycle control device 12 will be discussed and illustrated herein. Preferably, the cables 20, 24, 28 and 32 are conventional bicycle control cables that have an outer casing the covers an inner wire.

Figure 3:
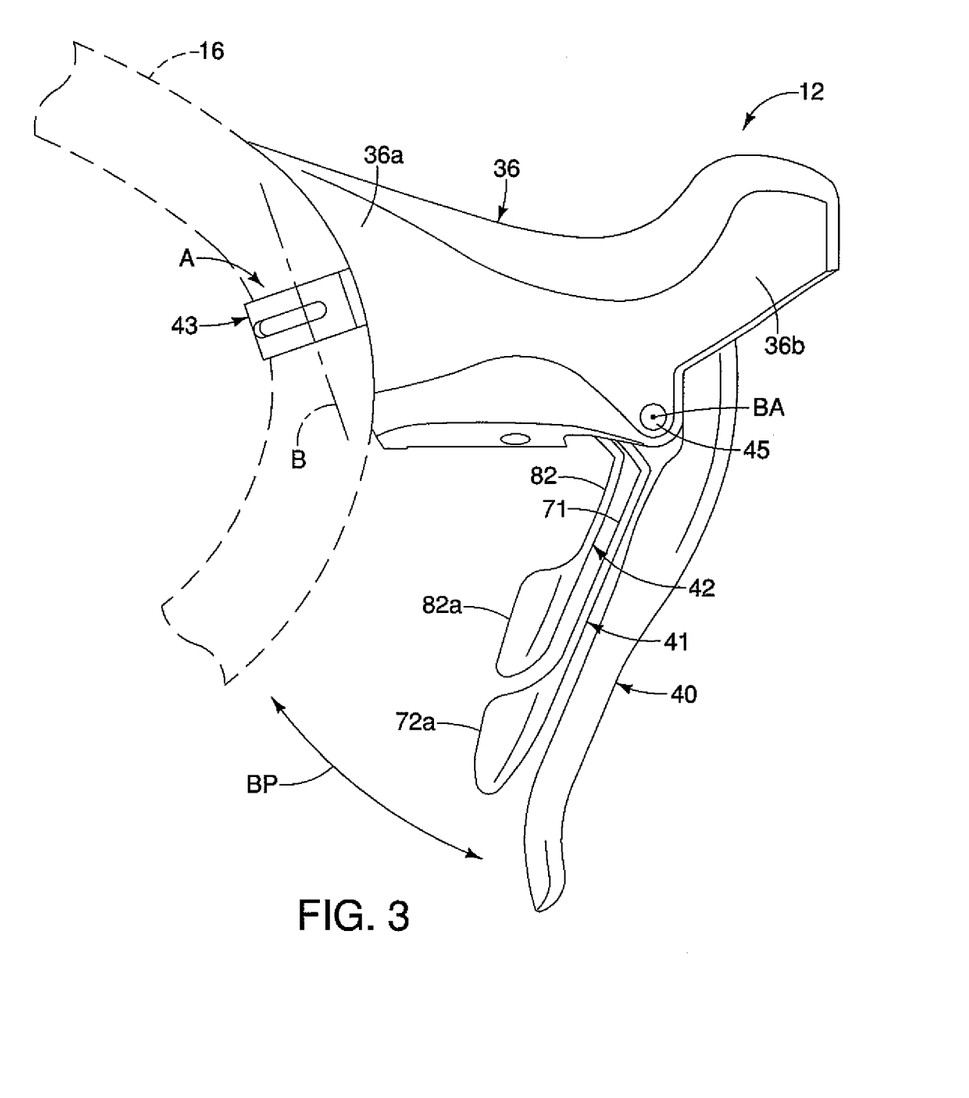
FIG. 3 is an outside elevational view of the right bicycle component actuating (brake/shift) device with the brake operating lever and the first and second shift operating levers in the rest positions.
Figure 12:
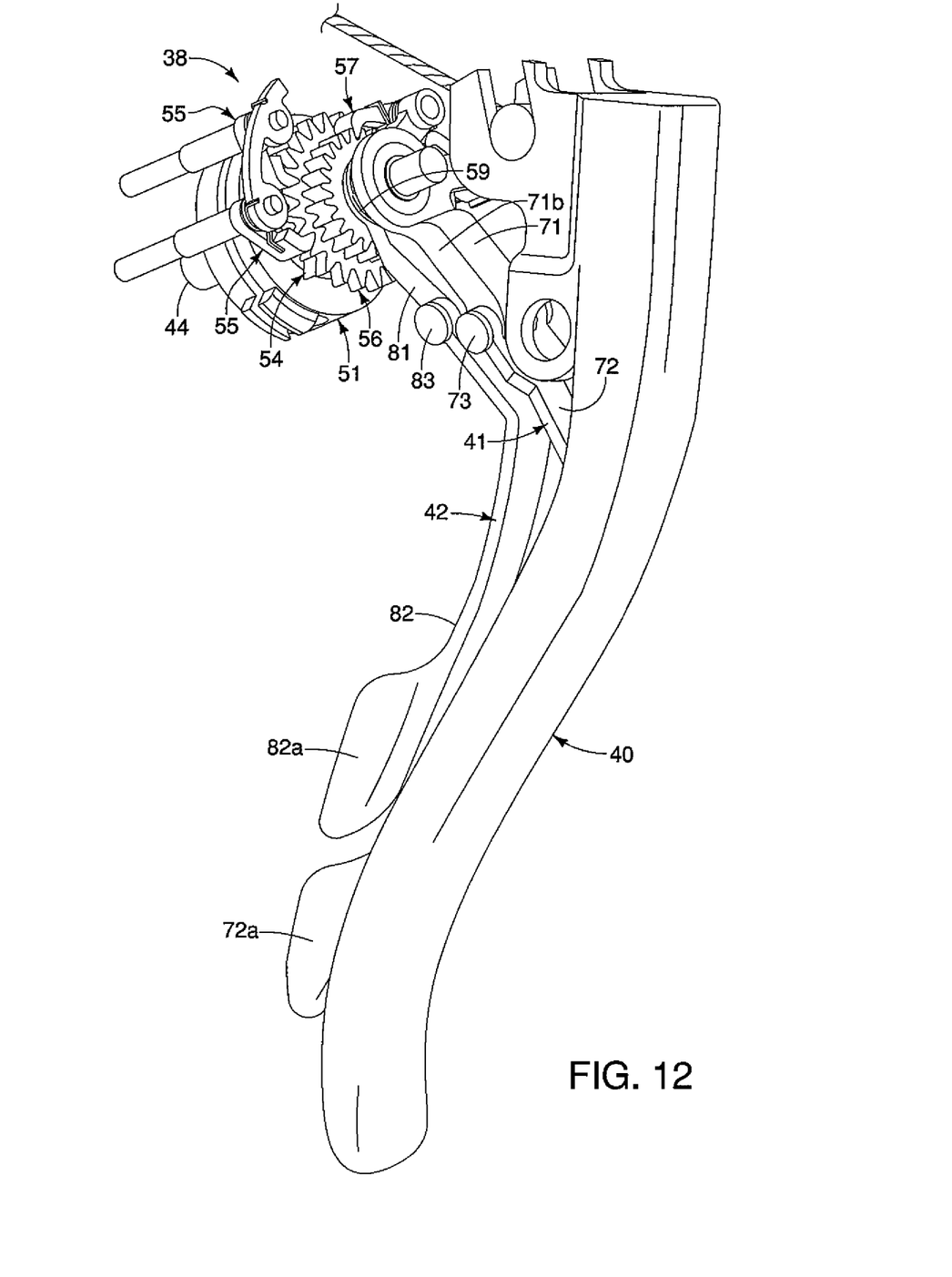
FIG. 12 is an enlarged partial perspective view of the shift control unit of the right bicycle component actuating (brake/shift) device with the brake operating lever and the first and second shift operating levers in the rest positions.
Figure 13:
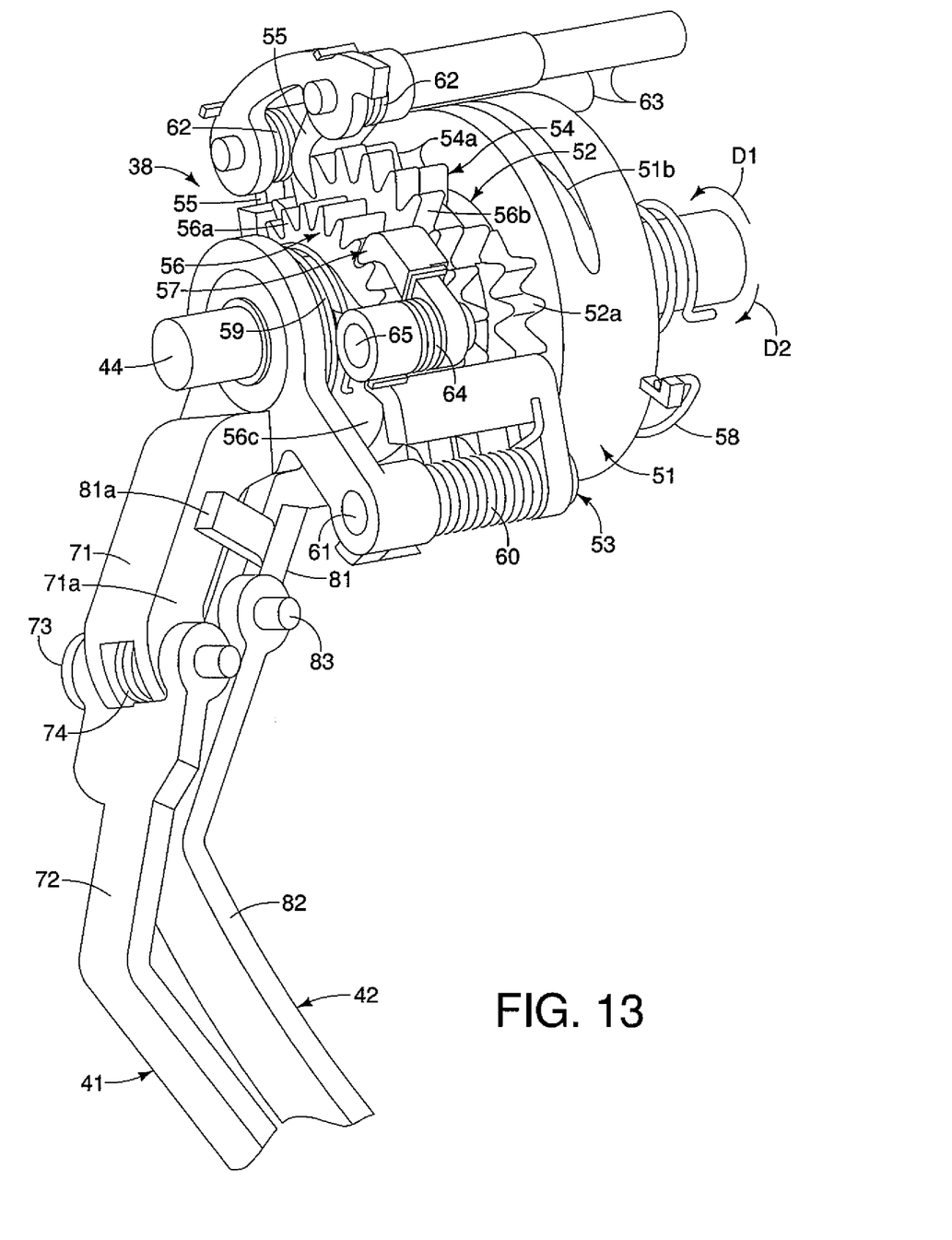
FIG. 13 is an enlarged partial perspective view of the shift control unit of the right bicycle component actuating (brake/shift) device.
Figure 14:
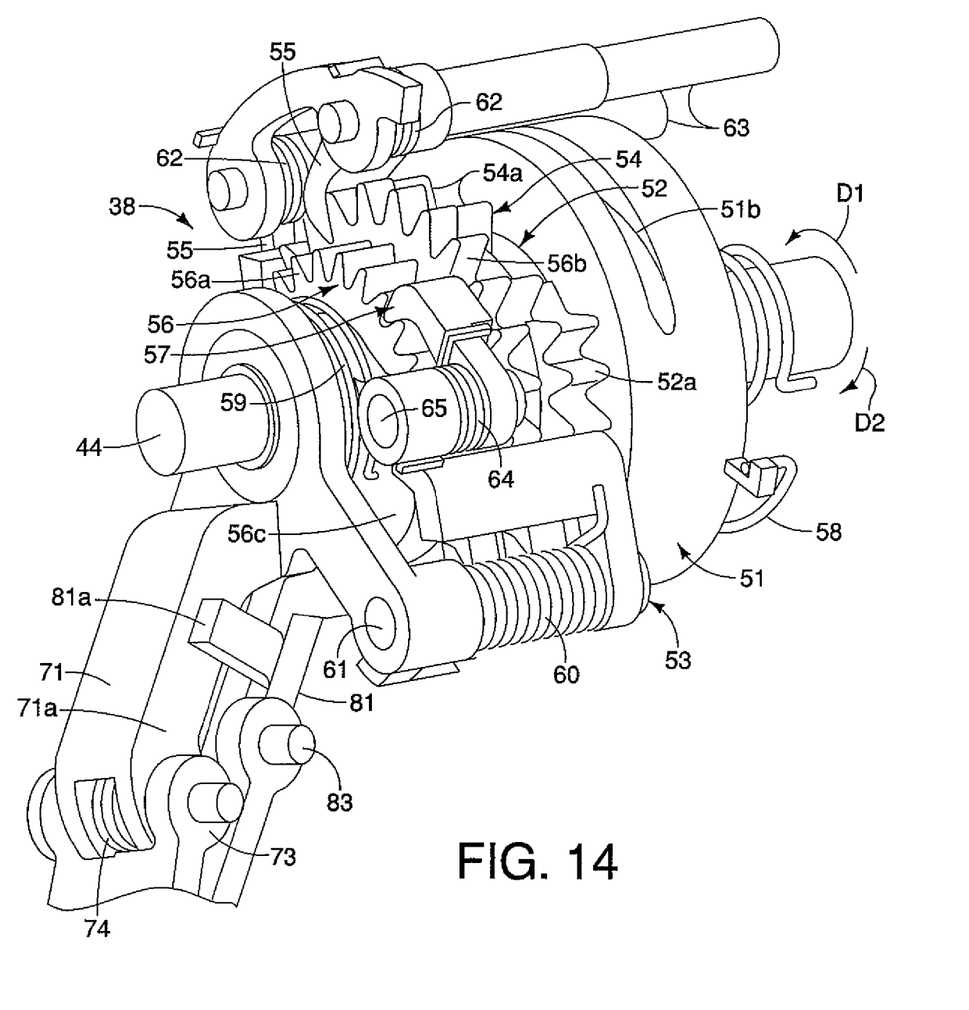
FIG. 14 is an enlarged partial perspective view of the shift control unit of the right bicycle component actuating (brake/shift) device.

Referring now to FIGS. 3 and 12, the bicycle control device 12 basically includes a base member 36, a shift control unit 38, a brake (non-shift) operating lever 40, a first shift operating lever 41 and a second shift operating lever 42. Thus, the bicycle control device 12 is configured and arranged to perform both a braking operation and a shifting operation as a single integrated unit that is mounted to the handlebar 16. In the illustrated embodiment, the first shift operating lever 41 is configured and arranged to perform a wire pulling operation, while the second shift operating lever 42 is configured and arranged to perform a wire releasing operation. The first and second shift operating levers 41 and 42 are located behind the brake (non-shift) operating lever 40, when the first and second shift operating levers 41 and 42 are in rest positions. The first and second shift operating levers 41 and 42 and the brake (non-shift) operating lever 40 are aligned in a movement plane or path BP of the brake (non-shift) operating lever 40, when the first and second shift operating levers 41 and 42 are in rest positions.

The base member 36 includes a main body having a first end section 36a with a handlebar mounting structure 43 and a second end section 36b remotely disposed from the first end section 36a. The first and second shift operating levers 41 and 42 and the brake (non-shift) operating lever 40 are located at the second end section 36b of the main body. The base member 36 is fixedly mounted to the handlebar 16 by the handlebar mounting structure 43, which defines a handlebar receiving area A with a central handlebar mounting axis B. The handlebar mounting structure 43 is preferably a conventional band clamp or similar structure.

In the illustrated embodiment, the shift control unit 38 is a cable operating device that includes a wire takeup member 51. The wire takeup member 51 is attached to the inner wire of the shift control cable 20 to pull and release the inner wire of the shift control cable 20 in response to operation of the first and second shift operating levers 41 and 42, respectively. The shift control unit 38 is mounted to the base member 36 by a main pivot shaft 44. The brake (non-shift) operating lever 40 is movably coupled relative to the base member 36 by a pivot pin 45 about a brake lever pivot axis BA. The first shift operating lever 41 is operatively coupled to the shift control unit 38 to operate the shift control unit 38 (mainly, the wire takeup member 51) in a first operating direction D1 or wire pulling direction about the main pivot shaft 44 of the shift control unit 38. The second shift operating lever 42 is operatively coupled to the shift control unit 38 to operate the shift control unit 38 (mainly, the wire takeup member 51) in a second operating direction D2 or wire releasing direction about the main pivot shaft 44 of the shift control unit 38.

Now referring to FIGS. 4 to 11, the movements of the brake (non-shift) operating lever 40 and the first and second shift operating levers 41 and 42 will now be generally discussed with respect to the base member 36 that is configured to be fixedly mounted to the handlebar 16 by the handlebar mounting structure 43.

Figure 4:
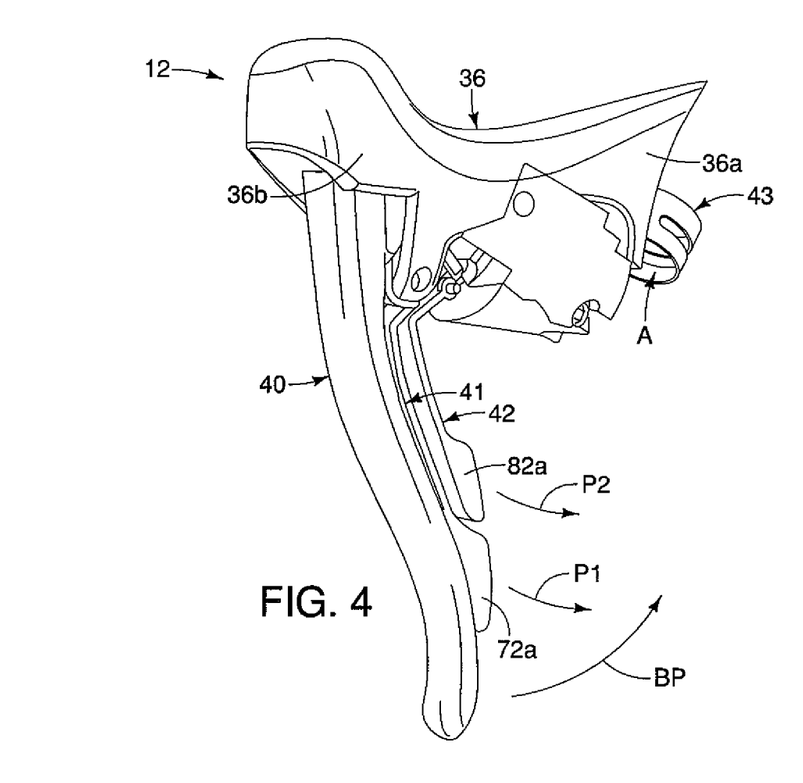
FIG. 4 is an inside perspective view of the right bicycle component actuating (brake/shift) device with the brake operating lever and the first and second shift operating levers in the rest positions.
Figure 5:
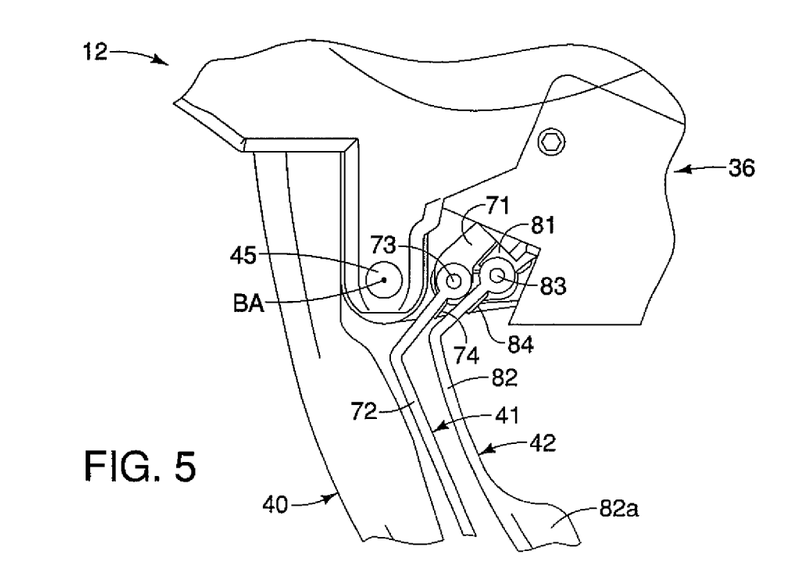
FIG. 5 is an enlarged partial inside elevational view of the right bicycle component actuating (brake/shift) device with the brake operating lever and the first and second shift operating levers in the rest positions.
Figure 6:
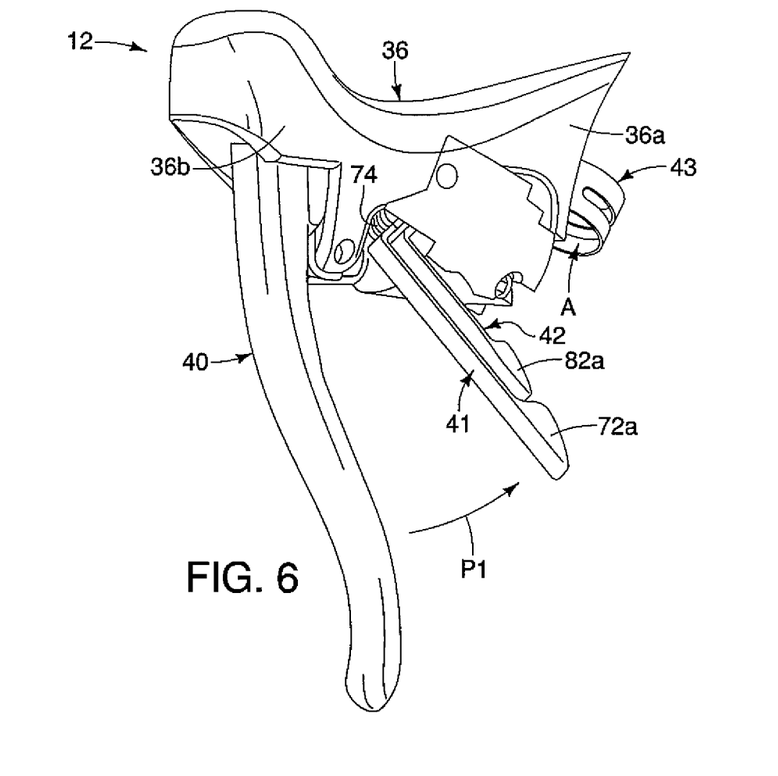
FIG. 6 is an inside perspective view of the right bicycle component actuating (brake/shift) device with the brake operating lever in the rest position and the first shift operating lever moved to a shifting position such that the second shift operating lever moves with the first shift operating lever.
Figure 7:
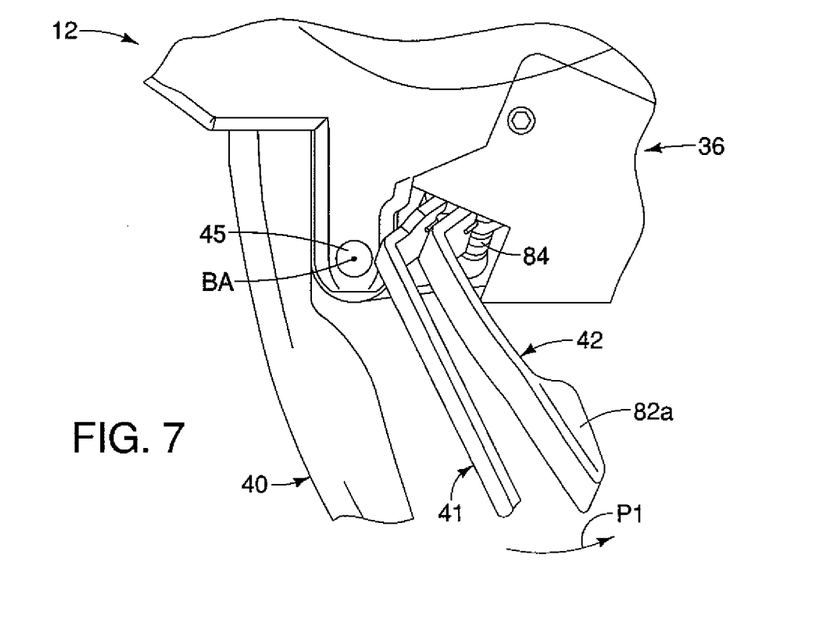
FIG. 7 is an enlarged partial inside elevational view of the right bicycle component actuating (brake/shift) device with the brake operating lever in the rest position and the first shift operating lever moved to a shifting position such that the second shift operating lever moves with the first shift operating lever.

As seen in FIGS. 4, 6 and 7, in this illustrated embodiment, the first and second shift operating levers 41 and 42 are configured and arranged relative to each other such that the second shift operating lever 42 is moved by the first shift operating lever 41 when the first shift operating lever 41 is operated to move the wire takeup member 51 of the shift control unit 38 in the first operating direction D1 about the main pivot shaft 44 of the shift control unit 38. In other words, when a wire pulling operation is desired, the rider pushes the first shift operating lever 41 in a direction transverse to a center plane of the base member 36 along a first shift operating plane or path P1 from a first (rest) position (FIG. 4) to a second (shifting) position (FIGS. 6 and 7). This movement of the first shift operating lever 41 operates the wire takeup member 51 of the shift control unit 38 in the first operating direction D1 which is a wire pulling operation in the illustrated embodiment. As mentioned above, the second shift operating lever 42 moves with the first shift operating lever 41 as the first shift operating lever 41 is moved from the first (rest) position to the second (shifting) position to operate the shift control unit 38.

Figure 8:
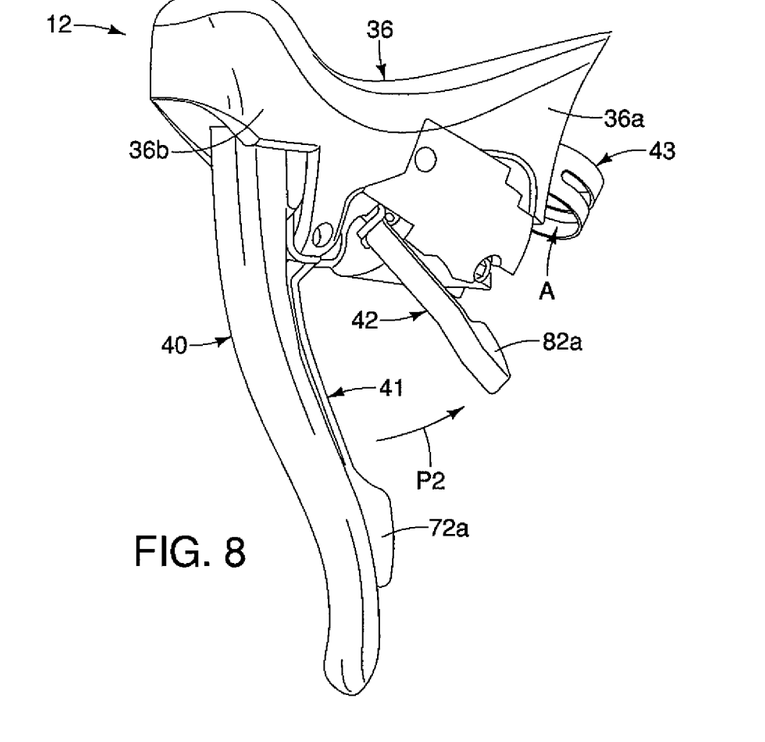
FIG. 8 is an inside perspective view of the right bicycle component actuating (brake/shift) device with the brake operating lever and the first shift operating lever in the rest positions and the second shift operating lever moved to a shifting position.
Figure 9:
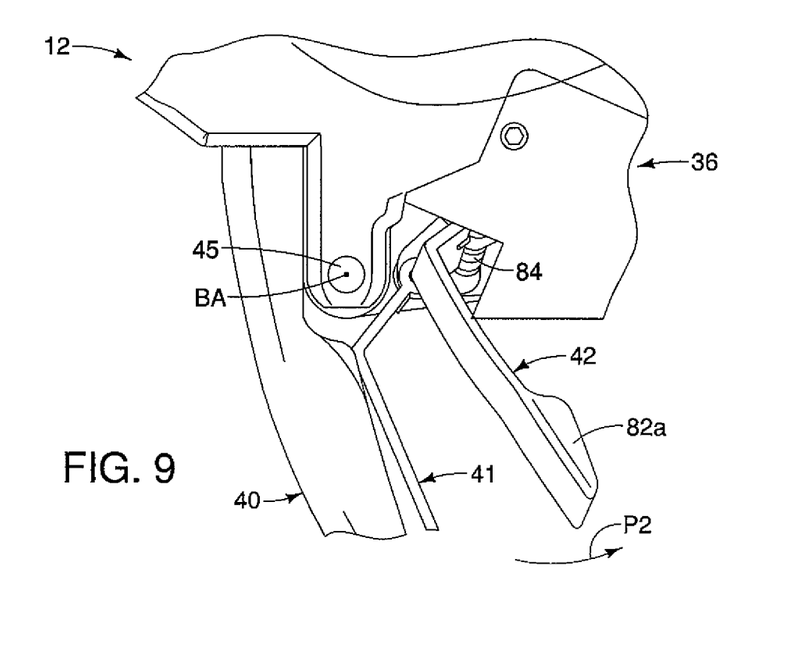
FIG. 9 is an enlarged partial inside elevational view of the right bicycle component actuating (brake/shift) device with the brake operating lever and the first shift operating lever in the rest positions and the second shift operating lever moved to a shifting position.

As seen in FIGS. 4, 8 and 9, in this illustrated embodiment, the first and second shift operating levers 41 and 42 are configured and arranged relative to each other such that the first shift operating lever 41 remains stationary when the second shift operating lever 42 is operated to move the wire takeup member 51 of the shift control unit 38 in the second operating direction D2 about the main pivot shaft 44 of the shift control unit 38. In other words, when a wire releasing operation is desired, the rider pushes the second shift operating lever 42 in a direction transverse to a center plane of the base member 36 along a second shift operating plane or path P2 from a first (rest) position (FIG. 4) to a second (shifting) position (FIGS. 8 and 9). This movement of the second shift operating lever 42 operates the wire takeup member 51 of the shift control unit 38 in the second operating direction D2 which is a wire releasing operation in the illustrated embodiment. As mentioned above, the second shift operating lever 42 moves independently with respect to the first shift operating lever 41 as the second shift operating lever 42 is moved from the first (rest) position to the second (shifting) position to operate the shift control unit 38.

Figure 10:
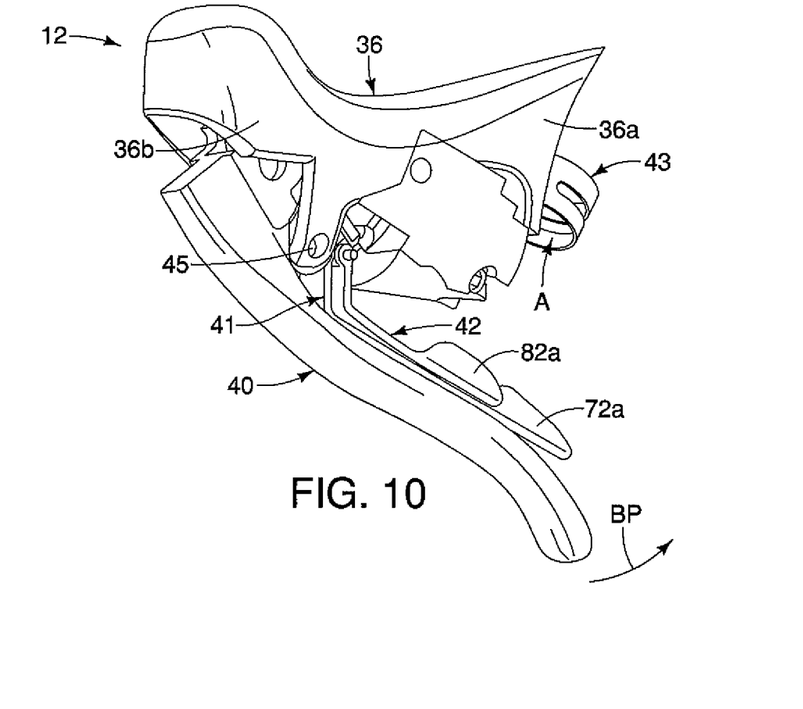
FIG. 10 is an inside perspective view of the right bicycle component actuating (brake/shift) device with the brake operating lever moved to a braking position and the first and second shift operating lever moved to non-shifting positions by the brake operating lever.
Figure 11:
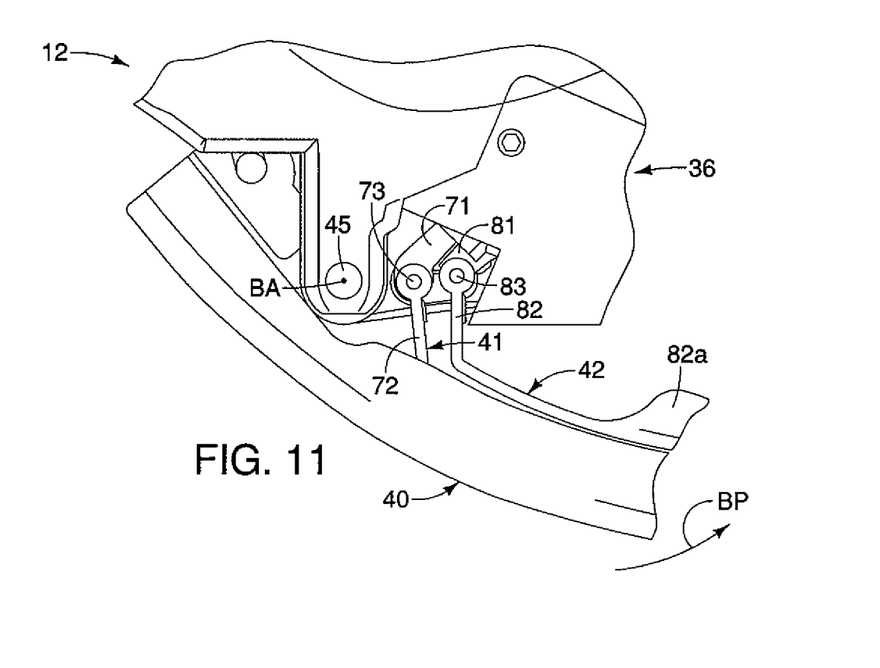
FIG. 11 is an enlarged partial inside elevational view of the night bicycle component actuating (brake/shift) device with the brake operating lever moved to a braking position and the first and second shift operating lever moved to non-shifting positions by the brake operating lever.

As seen in FIGS. 4, 10 and 11, in the illustrated embodiment, the brake (non-shift) operating lever 40 pivots about the pivot pin 45 between a first (rest) position (FIG. 4) and a second (braking) position (FIGS. 10 and 11) along a brake (non-shift) operating plane or path BP. The brake (non-shift) operating plane or path BP also constitutes the movement plane BP such that the brake (non-shift) operating lever 40 is pivotally coupled relative to the base member 36 about a pivot axis BA along the movement plane BP. The first and second shift operating levers 41 and 42 are coupled relative to the base member 36 to move along first and second shift operating planes P1 and P2, respectively, that intersect with the brake (non-shift) operating plane or path BP (movement plane) of the brake (non-shift) operating lever 40. The brake (non-shift) operating plane BP (movement plane) of the brake (non-shift) operating lever 40 is perpendicularly oriented with respect to the first and second shift operating planes P1 and P2 of the first and second shift operating levers 41 and 42. The movement of the brake (non-shift) operating lever 40 from the rest position to the braking position results in the first and second shift operating levers 41 and 42 also being pivoted along the brake (non-shift) operating plane BP as seen in FIGS. 10 and 11.

Referring now to FIGS. 12 to 15, the shift control unit 38, the brake (non-shift) operating lever 40, the first shift operating lever 41 and the second shift operating lever 42 will now be discussed in more detail.

The shift control unit 38 is basically operated by the first and second shift operating levers 41 and 42 to pull or release the inner wire of the shift control cable 20. The shift control unit 38 is mounted to the base member 36 by the main pivot shaft 44 as mentioned above. In addition to the wire takeup member 51, mentioned above, the shift control unit 38 further includes a winding plate or member 52, a winding pawl 53, a positioning plate or member 54, a pair of positioning pawls 55, a release plate or member 56 and a release pawl 57. The wire takeup member 51, the winding plate 52, the positioning plate 54 and the release plate 56 are all rotatably mounted on the main pivot shaft 44. The wire takeup member 51, the winding plate 52 and the positioning plate 54 are fixed together as an integrated unit so as to rotate together. The release plate 56 can rotate independently of the wire takeup member 51, the winding plate 52 and the positioning plate 54. A return spring or biasing element 58 is preferably operatively coupled between the wire takeup member 51 and the base member 36 to urge the wire takeup member 51, the winding plate 52 and the positioning plate 54 in the wire releasing direction about the main pivot shaft 44. In the illustrated embodiment, the return spring or biasing element 58 is a torsion spring with one end fixed to the wire takeup member 51 and the other end fixed to the base member 36.

A return spring or biasing element 59 is preferably operatively coupled between the second shift operating lever 42 and the base member 36 to urge the first and second shift operating levers 41 and 42 in a clockwise direction about the main pivot shaft 44 as seen in FIG. 12. The first portion 71 of the first shift operating lever 41 has an abutment 71b (first side surface) contacting a part of the base member 36 to maintain the first and second shift operating levers 41 and 42 in the rest positions. In the illustrated embodiment, the return spring or biasing element 59 is a torsion spring mounted on the main pivot shaft 44 with one end fixed to the second shift operating lever 42 and the other end fixed to the base member 36. Thus, the first and second shift operating levers 41 are normally maintained in the rest positions by the biasing element 59.

The first second shift operating lever 41 is configured and arranged relative to the wire takeup member 51 such that the first shift operating lever 41 performs the wire pulling operation of the wire takeup member 51 when the first shift operating lever 41 is operated. The second shift operating lever 42 is configured and arranged relative to the wire takeup member 51 such that the second shift operating lever 42 performs the wire releasing operation of the wire takeup member 51 when the second shift operating lever 42 is operated.

Figure 15:
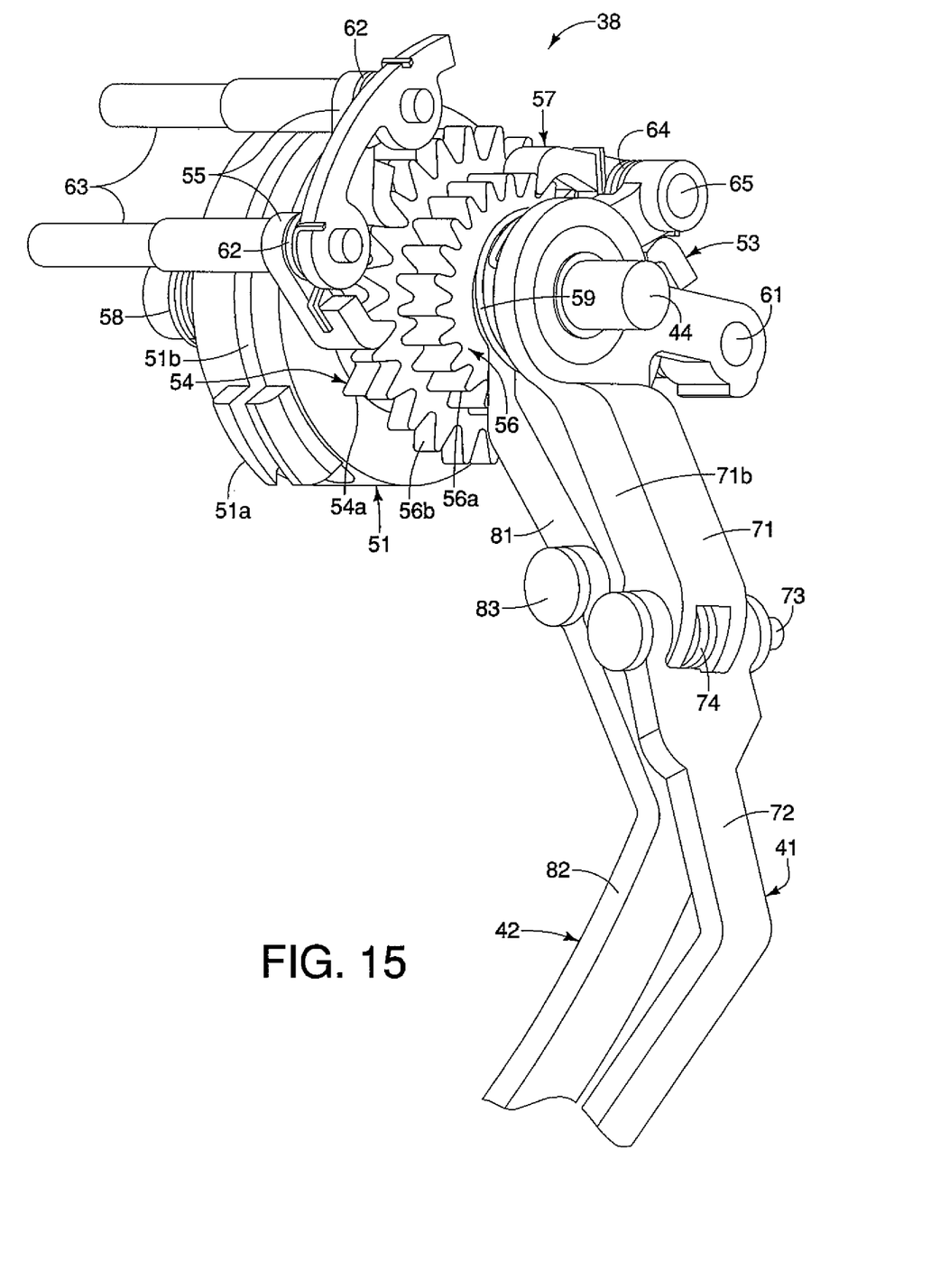
FIG. 15 is an enlarged partial perspective view of the shift control unit of the right bicycle component actuating (brake/shift) device.

The wire takeup member 51 is a wheel shaped member that has a peripheral edge with a cable attachment structure or point 51a and a wire receiving groove 51b as best seen in FIGS. 12 and 15. Thus, the wire takeup member 51 winds and unwinds the inner wire of the control cable 20 thereon.

The winding plate 52 is fixedly coupled to the wire takeup member 51 so as to rotate together. The winding plate 52 includes a plurality of winding teeth 52a that are selectively engaged by the winding pawl 53. The winding pawl 53 is pivotally mounted to the first shift operating lever 41, which in turn is pivotally mounted to the main pivot shaft 44. When the first shift operating lever 41 is moved from the first (rest) position to the second (shifting) position to operate the shift control unit 38, the winding pawl 53 engages the winding teeth 52a of the winding plate 52 to rotate the wire takeup member 51 in the wire pulling direction. The winding pawl 53 is normally urged towards engagement with the winding teeth 52a of the winding plate 52 by a biasing member 60. In this illustrated embodiment, the biasing member 60 is a torsion spring that is mounted on a pivot pin 61 which in turn attaches the winding pawl 53 to the first shift operating lever 41.

The positioning plate 54 cooperates with the positioning pawls 55 to maintain the wire takeup member 51 in one of a plurality of predetermined shift positions. In particular, the positioning plate 54 includes a plurality of positioning teeth 54a that are selectively engaged by the positioning pawls 55. Each of the positioning pawls 55 is normally urged towards engagement with the positioning teeth 54a of the positioning plate 54 by a biasing member 62. In this illustrated embodiment, the biasing members 62 are torsion springs that are mounted on pivot pins 63 which in turn attach the positioning pawls 55 to the base member 36. When the first shift operating lever 41 is moved from the first (rest) position to the second (shifting) position to operate the shift control unit 38, the positioning plate 54 is rotated so that the positioning teeth 54a of the positioning plate 54 move the positioning pawls 55 momentarily out of holding engagement with the positioning teeth 54a of the positioning plate 54. Thus, the positioning teeth 54a of the positioning plate 54 are ratchet teeth that are configured and arranged to ratchet the positioning pawls 55 when the wire takeup member 51 is rotated in the wire pulling direction.

The release plate 56 cooperates with the positioning pawls 55 to release the wire takeup member 51 so that the wire takeup member 51 rotates in the wire releasing direction due to the urging force of the return spring or biasing element 58 and a cable tension due to, for example, a pull force from the rear derailleur 18. In particular, the release plate 56 includes a plurality of driving teeth 56a, a plurality of release teeth 56b and a winding pawl disengagement portion 56c. The driving teeth 56a are selectively engaged by the release pawl 57, while the release teeth 56b selectively engage the positioning pawls 55. The winding pawl disengagement portion 56c moves the winding pawl 53 out of engagement with the winding teeth 52a of the winding plate 52 so that the winding plate 52 can rotate with respect to the winding pawl 53, when the second shift operating lever 42 is moved from the first (rest) position to the second (shifting) position to operate the shift control unit 38 in the wire releasing (unwinding) direction.

The release pawl 57 is normally urged towards engagement with the driving teeth 56a of the release plate 56 by a biasing member 64. In this illustrated embodiment, the biasing member 64 is a torsion spring that is mounted on a pivot pin 65 which in turn attaches the release pawl 57 to the second shift operating lever 42. When the second shift operating lever 42 is moved from the first (rest) position to the second (shifting) position to operate the shift control unit 38, the release plate 56 is rotated so that the release teeth 56b selectively engage the positioning pawls 55 to release the positioning plate 54. In particular, the release teeth 56b are ratchet teeth that are configured and arranged to ratchet the positioning pawls 55 when the release plate 56 is rotated in the first operating direction D1. Thus, the release plate 56 releases the wire takeup member 51 to rotates in the wire releasing direction due to the urging force of the return spring or biasing element 58 and cable tension in response to movement of the second shift operating lever 42.

The first shift operating lever 41 is pivotally mounted to the main pivot shaft 44 to move along the first shift operating plane or path P1. The first shift operating plane P1 intersects with the brake (non-shift) operating plane or path BP (movement plane) of the brake (non-shift) operating lever 40. The first shift operating lever 41 is located behind the brake (non-shift) operating lever 40 and the first shift operating lever 41 is located in front of the second shift operating lever 42, when the first and second shift operating levers 41 and 42 are in rest positions.

In particular, the first shift operating lever 41 basically includes a first portion 71 operatively coupled to the shift control unit 38 and a second portion 72 spaced from the first portion 71. A hinge pin 73 pivotally interconnecting the first and second portions 71 and 72 together. A biasing element 74 is mounted on the hinge pin 73 to urge the second portion 72 forwardly with respect to the first portion 71 to a rest position. This intermediate hinge between the first and second portions 71 and 72 allows the second portion 72 to pivot rearwardly with respect to the first portion 71 such as when the brake (non-shift) operating lever 40 is operated from the rest (non-braking) position to the braking position as seen in FIGS. 10 and 11. In other words, the first shift operating lever 41 include an intermediate hinge such that the second portion 72 of the first shift operating lever 41 is pivoted in non-operating direction when the brake (non-shift) operating lever 40 is operated.

The first portion 71 of the first shift operating lever 41 has an abutment 71a (second side surface) for moving the second shift operating lever 42 when the first shift operating lever 41 is operated. The second portion 72 of the first shift operating lever 41 has a first finger contact portion 72a located at the end opposite the intermediate hinge for moving the first shift operating lever 41 about the main pivot shaft 44 of the shift control unit 38. In other words, when the wire pulling operation is desired, the rider pushes the first finger contact portion 72a of the first shift operating lever 41 in a direction transverse to the brake (non-shift) operating plane or path BP (movement plane) of the brake (non-shift) operating lever 40 along the first shift operating plane or path P1 from the first (rest) position to the second (shifting) position to operate the shift control unit 38.

The second shift operating lever 42 is pivotally mounted to the main pivot shaft 44 to move along the second shift operating plane or path P2. The second shift operating plane P2 intersects with the brake (non-shift) operating plane or path BP (movement plane) of the brake (non-shift) operating lever 40. The second shift operating lever 42 is located behind the brake (non-shift) operating lever 40 and the first shift operating lever 41, when the first and second shift operating levers 41 and 42 are in rest positions.

In particular, the second shift operating lever 42 basically includes a first portion 81 operatively coupled to the shift control unit 38 and a second portion 82 spaced from the first portion 81. A hinge pin 83 pivotally interconnecting the first and second portions 81 and 82 together A biasing element 84 is mounted on the hinge pin 83 to urge the second portion 82 forwardly with respect to the first portion 81 to a rest position. This intermediate hinge between the first and second portions 81 and 82 allows the second portion 82 to pivot rearwardly with respect to the first portion 81 such as when the brake (non-shift) operating lever 40 is operated from the rest (non-braking) position to the braking position as seen in FIGS. 10 and 11. In other words, the second shift operating lever 42 include an intermediate hinge such that the second portion 82 of the second shift operating lever 42 is pivoted in non-operating direction when the brake (non-shift) operating lever 40 is operated.

The first portion 81 of the second shift operating lever 42 has an abutment 81a (flange) that contacts the abutment 71a of the first shift operating lever 41 such that the second shift operating lever 42 moves with the first shift operating lever 41 when the first shift operating lever 41 is operated. More specifically, due to the contact between the abutments 71a and 81a, as the first shift operating lever 41 is moved to operate the shift control unit 38, the second shift operating lever 42 moves only in a movement direction of the first shift operating lever 41 with respect to the base member 36 as a direct result of this movement of the first shift operating lever 41. In other words, the contact between the abutments 71a and 81a prevents the second shift operating lever 42 from moving in an opposite direction from the movement direction of the first shift operating lever 41. In addition, the second shift operating lever 42 is moved in a continuous stroke together with the first shift operating lever 41. Thus, the abutments 71a and 81a of the first and second shift operating levers 41 and 42 are configured and arranged relative to each other such that the second shift operating lever 42 is moved by the first shift operating lever 41. The second portion 82 of the second shift operating lever 42 has a second finger contact portion 82a located at the end opposite the intermediate hinge for moving the second shift operating lever 42 about the main pivot shaft 44 of the shift control unit 38. In other words, when the wire releasing operation is desired, the rider pushes the second finger contact portion 82a of the second shift operating lever 42 in a direction transverse to the brake (non-shift)

operating plane or path BP (movement plane) of the brake (non-shift) operating lever 40 along the second shift operating plane or path P2 from a first (rest) position (FIG. 4) to a second (shifting) position (FIGS. 8 and 9) to operate the shift control unit 38. The second finger contact portion 82a of the second shift operating lever 42 is disposed closer to the base member 36 than the first finger contact portion 72a of the first shift operating lever 41.

In the above discussed embodiment, the shift control unit 38 is illustrated as a cable operating shift control unit, which is merely one example of a shift control unit that can be used with the bicycle control device 12. In other words, the shift control unit for the bicycle control device 12 is not limited to a cable operating system, but rather other types of shift control units can be used with the bicycle control device 12 described and illustrated herein. For example, the shift control unit 38 can be replaced an electrical shift control unit, or a pneumatic shift control unit, or hydraulic shift control unit. In the case of an electrical shift control unit, at least a pair of electrical switches would be provided for performing upshift and downshift operations in response to selective movements of the first and second shift operating levers 41 and 42. In the case of a pneumatic shift control unit or hydraulic shift control unit, a valve system would be provided for performing upshift and downshift operations in response to selective movements of the first and second shift operating levers 41 and 42.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle control device comprising:
a base member;
a shift control unit fixedly mounted on the base member;
a non-shift operating lever movably coupled relative to both the base member and the shift control unit, the non-shift operating lever being pivotally coupled relative to the base member about a pivot axis along a movement plane, the non-shift operating lever being non-operatively coupled to the shift control unit such that operation of the non-shift operating lever with respect to the base member does not operate the shift control unit;
a first shift operating lever operatively coupled to the shift control unit to operate the shift control unit in a first operating direction of the shift control unit; and
a second shift operating lever operatively coupled to the shift control unit to operate the shift control unit in a second operating direction of the shift control unit that is distinct from the first operating direction, the first and second shift operating levers being coupled relative to the base member to move along first and second shift operating planes, respectively, that intersect with the movement plane of the non-shift operating lever,
the first shift operating lever moving the second shift operating lever together with the first shift operating lever in a single movement direction of the first and second operating levers as the first shift operating lever is moved by a user continuously and progressively from a rest position to a fully operated position in the single movement direction of the first and second operating levers to operate the shift control unit at least one shift position in the first operating direction of the shift control unit,
the non-shift operating lever, the first shift operating lever, and the second shift operating lever all being separate levers.

2. The bicycle control device according to claim 1, wherein the first shift operating lever remains stationary when the second shift operating lever is operated.

3. The bicycle control device according to claim 1, wherein the first shift operating lever has an abutment for moving the second shift operating lever when the first shift operating lever is operated.

4. The bicycle control device according to claim 1, wherein the shift control unit includes a wire takeup member; and
the first and second shift operating levers are configured and arranged relative to the wire takeup member, the first shift operating lever performing a wire pulling operation of the wire takeup member as the first shift operating lever moves from the rest position to the fully operated position, and the second shift operating lever performing a wire releasing operation of the wire takeup member as the second shift operating lever is operated.

5. The bicycle control device according to claim 1, wherein the first and second shift operating levers and the non-shift operating lever are aligned in a movement plane of the non-shift operating lever while the first and second shift operating levers are in rest positions.

6. The bicycle control device according to claim 1, wherein the first and second shift operating levers are located behind the non-shift operating lever while the first and second shift operating levers are in rest positions.

7. The bicycle control device according to claim 6, wherein the shift control unit includes a wire takeup member;
the first and second shift operating levers are configured and arranged relative to the wire takeup member, the first shift operating lever performing a wire pulling operation of the wire takeup member as the first shift operating lever moves from the rest position to the fully operated position, and the second shift operating lever performing a wire releasing operation of the wire takeup member as the second shift operating lever is operated; and the non-shift operating lever is configured and arranged to perform a braking operation.

8. The bicycle control device according to claim 6, wherein the first shift operating lever is located behind the non-shift operating lever and the second shift operating lever is located behind the first shift operating lever while the first and second shift operating levers are in rest positions.

9. The bicycle control device according to claim 1, wherein the first shift operating lever has a first finger contact portion and the second shift operating lever has a second finger contact portion, with the second finger contact portion being closer to the base member than the first finger contact portion.

10. The bicycle control device according to claim 1, wherein
the movement plane of the non-shift operating lever is perpendicularly oriented with respect to the first and second shift operating planes of the first and second shift operating levers.

11. The bicycle control device according to claim 1, wherein
the base member includes a main body having a first end section with a handlebar mounting structure and a second end section remotely disposed from the first end section, the first and second shift operating levers and the non-,shift operating lever being located at the second end section of the main body.

12. The bicycle control device according to claim 1, wherein
the first and second shift operating levers include hinges, the first and second shift operating levers being pivoted in non-operating directions by the non-shift operating lever as the non-shift operating lever is operated.

13. A bicycle control device comprising:
a base member;
a shift control unit fixedly mounted on the base member;
a non-shift operating lever movably coupled relative to both the base member and the shift control unit, the non-shift operating lever being pivotally coupled relative to the base member about a pivot axis along a movement plane, the non-shift operating lever being non-operatively coupled to the shift control unit;
a first shift operating lever operatively coupled to the shift control unit to operate the shift control unit in a first operating direction of the shift control unit; and
a second shift operating lever operatively coupled to the shift control unit to operate the shift control unit in a second operating direction of the shift control unit that is distinct from the first operating direction, the first and second shift operating levers being coupled relative to the base member to move along first and second shift operating planes, respectively, that intersect with the movement plane of the non-shift operating lever, the first shift operating lever moving the second shift operating lever together with the first shift operating lever in a single movement direction of the first and second operating levers as the first shift operating lever is moved by a user continuously and progressively from a rest position to a fully operated position in the single movement direction of the first and second operating levers to operate the shift control unit at least one shift position in the first operating direction of the shift control unit, the first and second shift operating levers pivoting on first and second hinge pins in response to a brake operation by the non-shift operating lever as the non-shift operating lever is operated, the non-shift operating lever, the first shift operating lever, and the second shift operating lever all being separate levers.

14. The bicycle control device according to claim 1, wherein
the first and second shift operating levers pivot on a single shift axis as the first and second shift operating levers operate the shift control unit, and the second shift operating lever moves independently of the first shift operating lever as the second shift operating lever is pivoted to operate the shift control unit.

15. A bicycle control device comprising:
a base member;
a shift control unit mounted to the base member;
a non-shift operating lever movably coupled relative to the base member, the non-shift operating lever being non-operatively coupled to the shift control unit;
a first shift operating lever operatively coupled to the shift control unit; and
a second shift operating lever operatively coupled to the shift control unit, the first and second shift operating levers being configured and arranged relative to each other such that the second shift operating lever is moved by the first shift operating lever when the first shift operating lever is operated, the first shift operating lever having a first abutment for moving the second shift operating lever by directly contacting the second shift operating lever when the first shift operating lever is operated, the second shift operating lever having a second abutment which moves away from the first abutment as the second shift operating lever is operated from a rest position, the non-shift operating lever, the first shift operating lever, and the second shift operating lever all being separate levers.

* * * * *